(12) United States Patent
Allison et al.

(10) Patent No.: US 6,430,665 B1
(45) Date of Patent: Aug. 6, 2002

(54) SYSTEM AND METHOD FOR HEURISTICALLY ALLOCATING MEMORY

(75) Inventors: David Allison, San Ramon; Elliot Poger, San Francisco; Raphael Jacoby, Mountain View, all of CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/339,808

(22) Filed: Jun. 25, 1999

(51) Int. Cl.[7] .............................................. G06F 12/00
(52) U.S. Cl. ...................................... 711/172; 711/158
(58) Field of Search ................................. 711/152, 170, 711/172, 158; 707/7, 205

(56) References Cited

U.S. PATENT DOCUMENTS

| | | | | | |
|---|---|---|---|---|---|
| 5,561,786 A | * | 10/1996 | Morse | ........................ | 711/170 |
| 5,577,243 A | * | 11/1996 | Sherwood et al. | ............. | 707/7 |
| 5,675,790 A | * | 10/1997 | Walls | ......................... | 707/205 |
| 5,742,793 A | * | 4/1998 | Sturges et al. | .............. | 711/152 |
| 5,930,827 A | * | 7/1999 | Sturges | ....................... | 711/170 |
| 5,950,231 A | * | 9/1999 | Nichol | ....................... | 711/170 |

* cited by examiner

Primary Examiner—David Hudspeth
Assistant Examiner—Fred F. Tzeng
(74) Attorney, Agent, or Firm—Finnegan, Henderson, Farabow, Garrett, & Dunner, LLP

(57) ABSTRACT

Methods and systems consistent with the invention allocate memory of a memory array using a free list. The free list is a list of pointers to blocks of free memory located within the memory array. First, the system determines whether to sort the free list based on deallocation activity of the memory array. If so, the system sorts the free list according to the memory size of the blocks of free memory pointed to by the free list. The system then allocates memory of the memory array for the storage of data using the sorted free list.

45 Claims, 4 Drawing Sheets

SYSTEM AND METHOD FOR HEURISTICALLY ALLOCATING MEMORY

RELATED APPLICATION

This application is related to copending U.S. application Ser. No. 09/337,552, entitled "System and Method for Allocating Memory by Partitioning a Memory," which is assigned to the same assignee and filed on the same date as this application, and incorporated by reference.

BACKGROUND OF THE INVENTION

1. Field of the Invention

The present invention relates to systems and methods for allocating memory and, more particularly, to systems and methods for allocating memory by using a heuristic analysis.

2. Description of the Related Art

Most data processing systems have a fixed amount of memory for running computer programs. Although a larger amount of memory would increase the speed and flexibility of the system, it would also increase the size and cost of the system as well. This tradeoff is especially true for embedded data processing systems, such as computerized fax machines and telephone answering machines, since they typically have a limited amount of memory to minimize size and cost.

Unfortunately, smaller memories tend to become severely fragmented during program execution. Memory becomes fragmented when it contains a random assortment of free memory blocks located between allocated memory blocks. This usually occurs after data has been repeatedly allocated and deallocated (i.e., freed) to the memory. FIG. 1 illustrates an example of a fragmented memory array 100 containing blocks of free memory 110 and blocks of allocated memory 120. As shown in FIG. 1, the amount of free memory is broken up into various sizes of free memory blocks 110.

Fragmentation causes several problems. First, fragmentation makes the memory less efficient by breaking up the free memory into blocks of various sizes. Thus, a memory system must search for an adequately sized block of free memory before it can store data of a certain size. This increases processing time, typically by an amount proportional to the number of free blocks. Second, fragmentation often causes a loss of overall effective memory since some of the free blocks will be too small to be of any use.

One way to reduce fragmentation is by having a memory system that allocates data in an optimum manner based on the particularly memory requirements of the overall data processing system. This approach is nearly impossible, however, since there is no reliable way to predict the exact memory requirements for each program using the memory. Other approaches use a free list to efficiently allocate data to the memory. As known in the art, the free list is a file created by the memory system that comprises a linked-list of pointers to each block of free memory in the memory array. The pointers are typically ordered by the memory addresses of the corresponding free memory blocks. Thus, the first pointer of the free list points to the first free memory block in the array, while the second pointer points to the second free memory block, and so on. For purposes of illustration, FIG. 1 shows a representation of such a free list 130 for memory array 100.

Conventional methods that allocate memory by using a free list include the "first-fit" and the "best-fit" approaches. Under the first-fit approach, the memory system traverses the free list until it encounters a pointer to a block large enough to store the data. The memory system usually uses a linear search to traverse the free-list. Accordingly, the longer the free list (i.e., the greater the number of free memory blocks), the longer will be the average time to locate the first block of sufficient size. Although this approach is relatively fast, it is not very efficient. In particular, the first-fit approach simply allocates the data to the first free memory block capable of storing the data, rather than to the free memory block that most closely matches the data size.

The best-fit approach, on the other hand, is more efficient but requires more processing time. Under the best-fit approach, the memory system searches for a free block whose size most closely matches the size of the data to be stored. To increase the search speed, the system first sorts the free list according to the size of the free blocks.

Because a smaller amount of free memory typically remains after each allocation, the system must re-sort the free list after each allocation. In particular, the block of free memory that best-fits the data to be allocated is normally somewhat larger than the stored data. Thus, the system must re-sort the free list to reorder the remaining amount of free memory. Similarly, the system must re-sort after each deallocation. This constant re-sorting after each allocation or deallocation requires a substantial amount of processing time, making this approach undesirable.

Therefore, it is desirable to have a memory system that can allocate memory without causing fragmentation. Furthermore, it is desirable to have a memory system that can reduce fragmentation efficiently and without taking a large amount of processing time.

SUMMARY OF THE INVENTION

Systems and methods consistent with the present invention reduce fragmentation of a memory array by efficiently allocating memory to the memory array, and without requiring a large amount of processing time.

In accordance with the purposes of the invention as embodied and broadly described herein, a memory management system and method consistent with the present invention provides a list of pointers to blocks of free memory of a memory array. The system then determines whether to sort the list based on deallocation activity of the memory array. Finally, the system sorts the list, based on the sort determination, according to the memory size of the blocks of free memory indicated by the list.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DETAILED DESCRIPTION

Overview

Systems and methods consistent with the present invention allocate memory of a memory array using a free list of pointers to blocks of free memory located within the memory array. The system includes a memory allocator that determines whether to sort the free list based on certain deallocation activity of the memory array. For example, the memory allocator may determine whether to sort the free list based on the frequency of deallocation instructions made to the memory array and/or based on the time since the last re-sorting.

Once the memory allocator determines to sort the free list, it then sorts the free list according to the memory size of the blocks of free memory pointed to by the free list. Using the sorted free list, the memory allocator then quickly determines the block of free memory that best matches the data to be stored in the memory array. Finally, the memory allocator causes that block of memory to be allocated to the data.

System Organization

Figure 1:
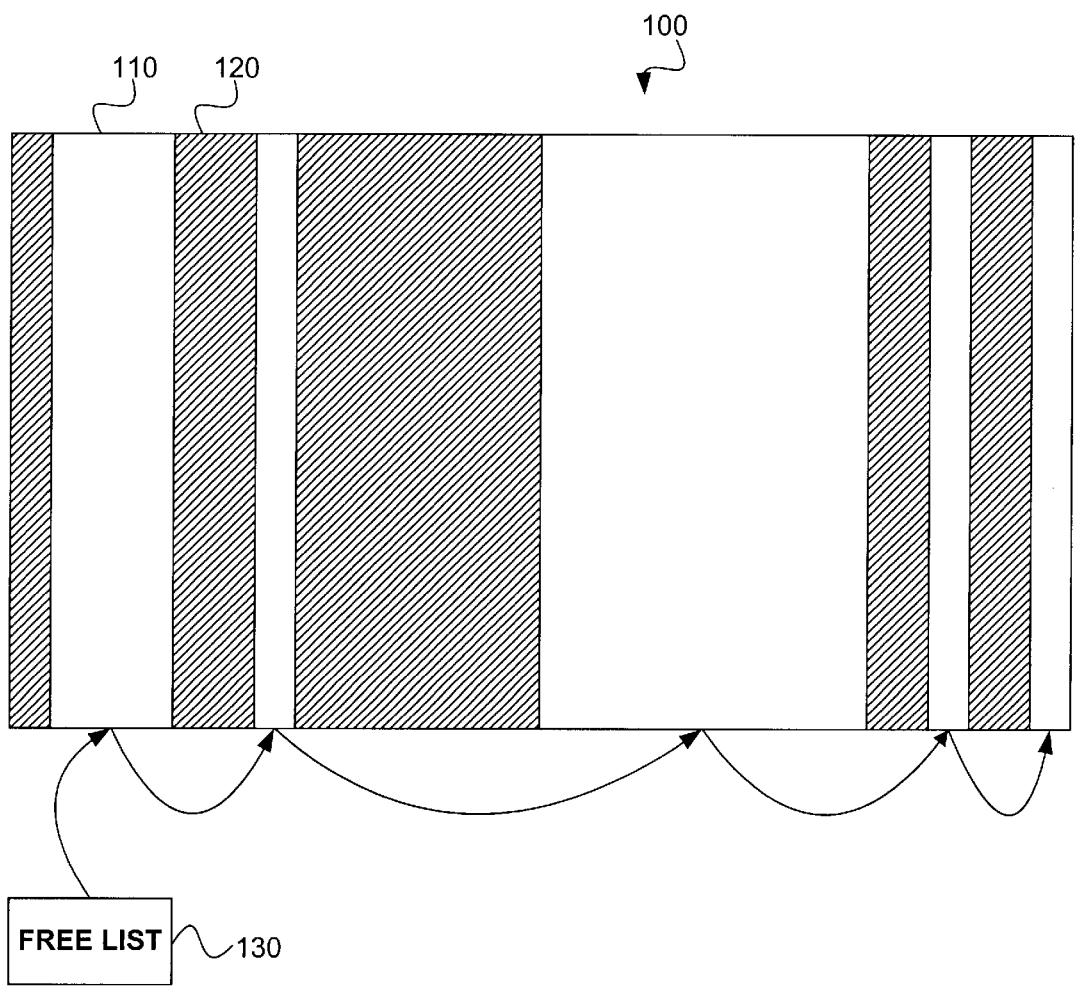
FIG. 1 illustrates an example of a fragmented memory.
Figure 2:
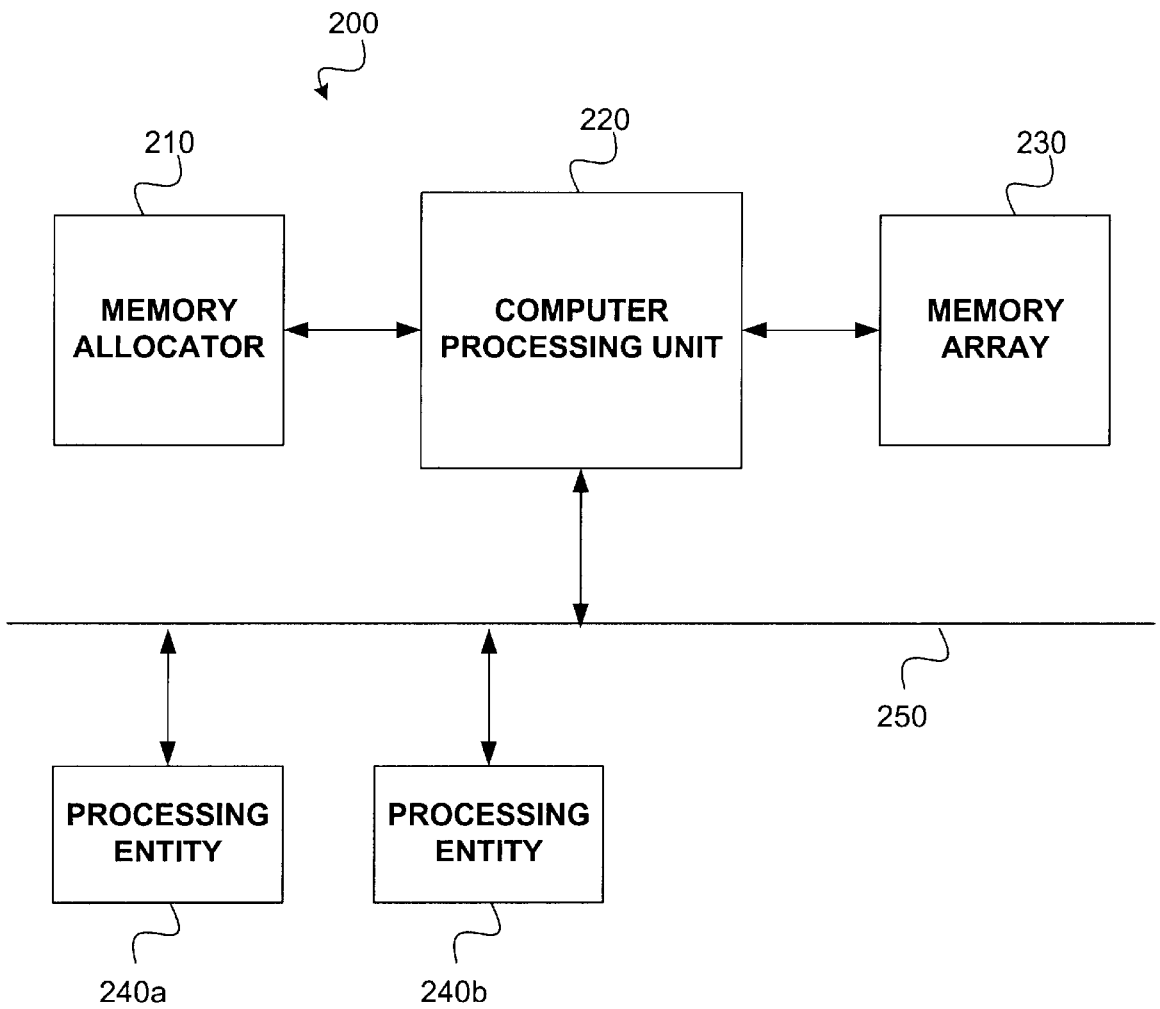
FIG. 2 shows a block diagram of a memory system consistent with the present invention.

FIG. 2 is a block diagram of a memory system 200 consistent with the present invention. As shown in FIG. 2, the memory system 200 includes a memory allocator 210, a computer processing unit (CPU) 220, a memory 230, and a number of processing entities 240. Although memory system 200 is preferably part of an embedded data processing system, memory system 200 may be part of any data processing system, such as those found in personal digital assistants, personal computers, network computers, workstations, and even mainframe computers.

Memory allocator 210 is preferably a computer software program, stored on a read only memory (ROM) (not shown), that controls the allocation of memory 230. Memory allocator 210 also stores a free list that comprises a list of pointers to free memory blocks of memory 230. CPU 220 runs the computer program of memory allocator 210 when allocating blocks of memory 230.

In addition, CPU 220 runs processing entities 240 via a bus line 250. Processing entities 240 are either hardware devices or computer software programs preferably stored on a random access memory (RAM) (not shown). Processing entities 240 output instructions to CPU 220 requesting CPU 220 to either allocate or deallocate a portion of memory 230. When allocating memory, processing entities 240 typically generate the actual data stored in memory 230. Thus, memory allocator 210 controls CPU 220 when allocating the blocks of memory 230 based on an instruction received from one of processing entities 240.

System Operation

Figure 3:
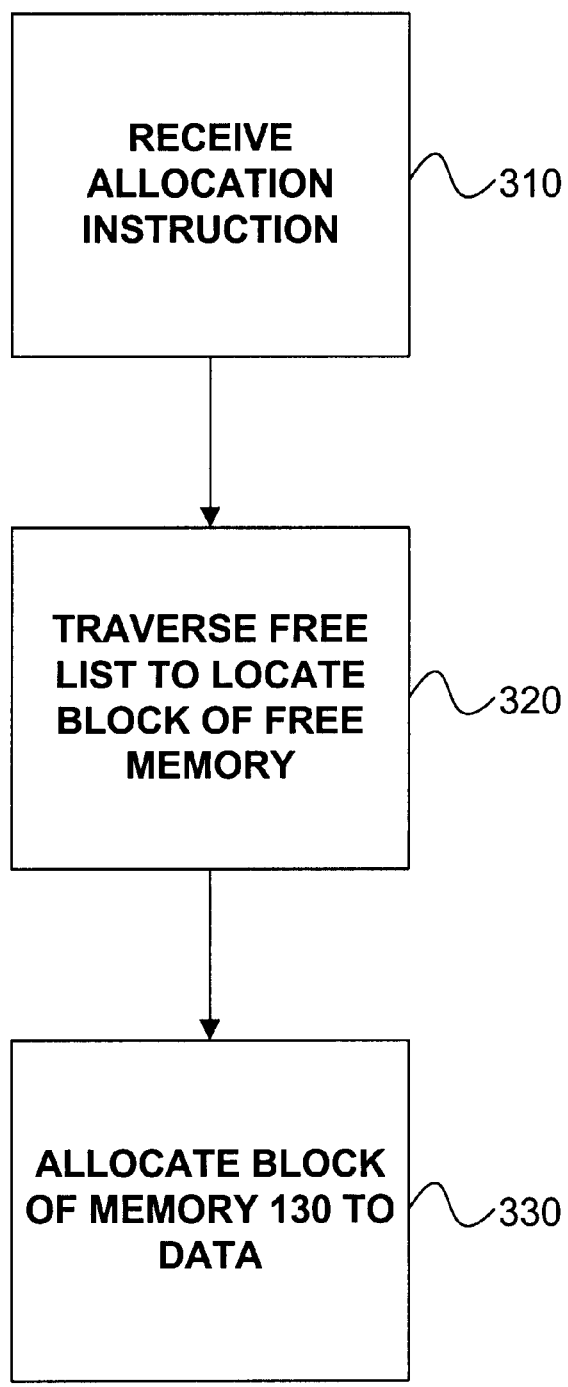
FIG. 3 shows a flow diagram of a memory allocation method consistent with present invention.

FIG. 3 shows a flow diagram of a memory allocation method consistent with present invention. As shown in FIG. 3, the allocation method begins when CPU 220 receives an instruction from one of processing entities 240 requesting CPU 220 to allocate a portion of memory 230 (step 310). Typically, any data stored in memory 230 is data generated by processing entities 240. When CPU 220 receives an instruction to deallocate a portion of memory 230, CPU 220 simply deallocates the memory block identified by the deallocation instruction. Thus, memory allocator 210 only controls the allocation of memory 230.

After CPU 220 receives the allocation instruction, memory allocator 210 traverses the free list to determine the block of free memory in memory 230 that can store the data (step 320). As described above, the free list contains a list of pointers to blocks of free memory in memory 230. By traversing this list, memory allocator 210 can determine the size of each free memory block. Furthermore, and as described below with respect to FIG. 4, memory allocator 210 intermittently sorts the free list according to the size of the free memory blocks.

Thus, memory allocator 210 can quickly locate the free memory block that best fits that data to be stored in memory 230. In particular, memory allocator 210 searches the free list to locate the first block of free memory that fits the size of the data. Because memory system 200 sorts the free list according to the memory size of the free memory blocks, the first located block of free memory is the block that best fits the data. In other words, the located block either matches the data size or is nearly the smallest free memory block that is larger than the size of the data. Once memory allocator 210 determines which block of free memory will store the data, memory allocator 210 outputs an instruction to CPU 220 requesting CPU 220 to store the data at the corresponding memory address identified by the free list (step 330).

Figure 4:
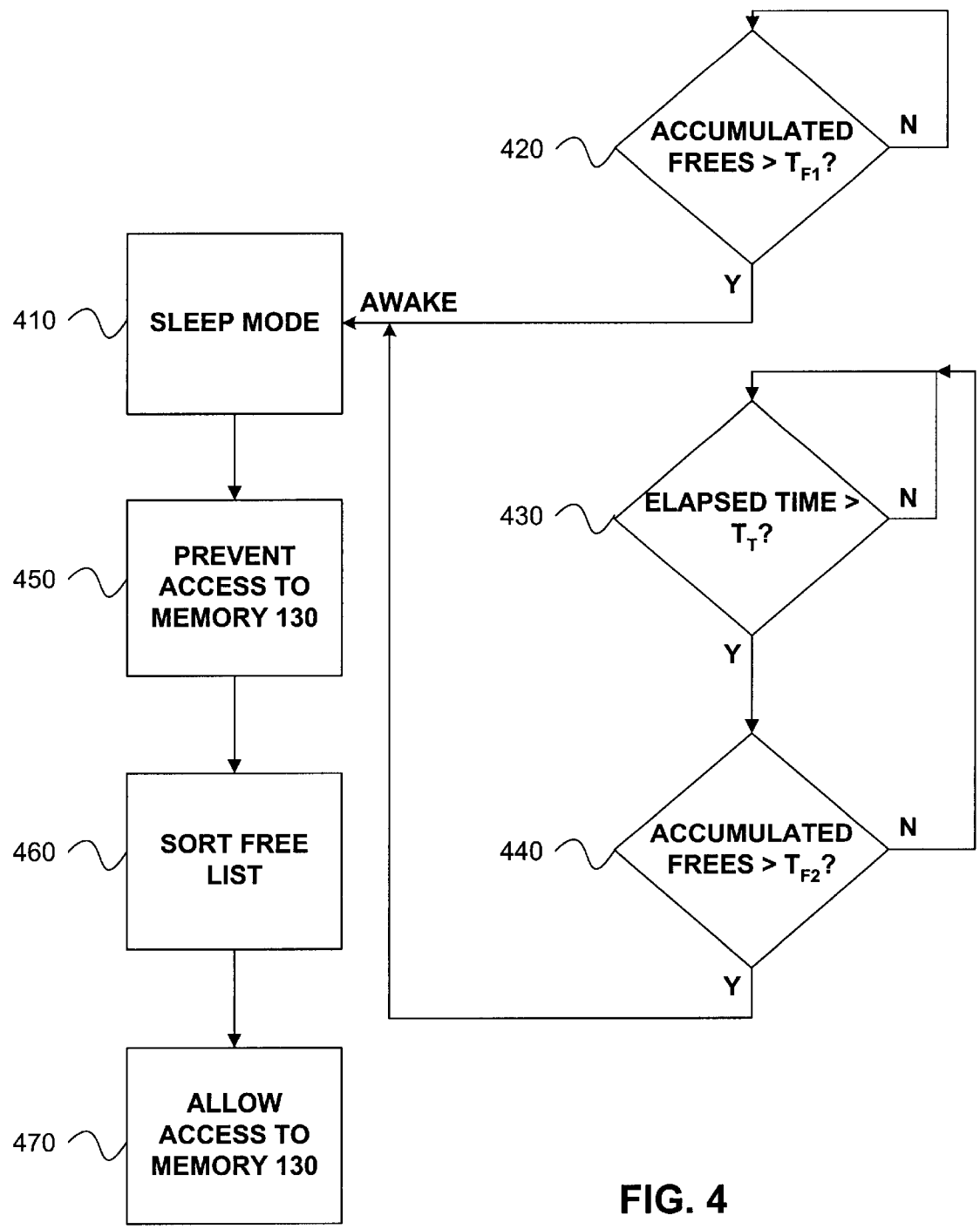
FIG. 4 shows a flow diagram of a free list sorting method consistent with the present invention.

FIG. 4 shows a flow diagram of a method for sorting the free list consistent with the present invention. Memory allocator 210 preferably contains the software code for sorting the free list. As described above with regard to step 320, memory allocator 210 traverses the sorted free list to determine which block of free memory to allocate. As shown in FIG. 4, the sorting function of memory allocator 210 remains in a sleep state until an awake signal is received (step 410). The awake signal may be output due to the occurrence of an event in either step 420 or step 430.

During step 420, a counter (not shown) counts the number of deallocation instructions ("frees") received by CPU 220. After each deallocation operation, memory allocator 210 compares the accumulated number of frees to a threshold value $T_{F1}$. If the number of frees is greater than the threshold value $T_{F1}$, then the counter outputs an awake signal to awaken the sorting function. Systems consistent with the invention preferably use a threshold value $T_{F1}$, of 100. After each awake signal output by the counter, memory allocator 210 resets the counter to zero.

During step 430, a timer (not shown) counts the time since the last awake signal output during step 420. When the timer reaches a timer threshold $T_T$, memory allocator 210 then compares the accumulated number of frees since the free list was last re-sorted to a threshold value $T_{F2}$ (step 440). If the number of frees is greater than the threshold value $T_{F2}$, then an awake signal is output to awaken the sorting function. If the number of frees is less than the threshold value $T_{F2}$, then an awake signal is not output and memory allocator 210 resets the timer that counts to the timer threshold $T_T$.

In this way, the timer starts the sort function when CPU 220 receives a relatively infrequent number of deallocation instructions, thereby taking advantage of a lull in system activity. Before outputting the awake signal, however, memory allocator 210 first compares the accumulated number of frees to the threshold value $T_{F2}$ since the number of frees may still be so low as to not warrant sorting the free list. Systems consistent with the invention preferably use a threshold value $T_T$ of 0.5 seconds and a threshold value $T_{F2}$ of 50. After each expiration of the timer, memory allocator 210 resets the timer.

Once the sort function of the memory allocator 210 has awaken, CPU 220 prevents access to memory 230 (step 450). This prevents any changes being made to the configuration of memory 230 while memory allocator 210 performs the sort function. Next, memory allocator 210 sorts the free list according to the size of the free blocks (step 460). Thus, memory allocator 210 re-sorts the free list such that each pointer in the list points to the next largest block of free memory. Finally, CPU 220 allows access to memory 230, thereby allowing processing entities 240 to allocate or deallocate data (step 470).

CONCLUSION

Systems and methods consistent with the present invention allocate memory of a memory array by sorting a free list through the use of a heuristic analysis. Such methods consistent with the present invention are applicable to all programs for execution in a multiprocessor system regardless of the computer programming language. For example, C++ is a programming language commonly used to develop programs for execution by multiprocessor computer systems.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, the described implementation includes software but the present invention may be implemented as a combination of hardware and software or in hardware alone. Further, the invention may be implemented with both object-oriented and non-object-oriented programming systems.

Although aspects of the present invention are described as being stored in memory, one skilled in the art will appreciate that these aspects can also be stored on other types of computer-readable media, such as secondary storage devices, like hard disks, floppy disks, or CD-ROM; a carrier wave from the Internet; or other forms of RAM or ROM. The scope of the invention is defined by the claims and their equivalents.

What is claimed is:

1. A method for managing a memory array, comprising the steps, performed by a processor, of:
   providing a list of pointers to blocks of free memory of the memory array, each block having a memory size;
   determining whether to sort the list based on deallocation activity of the memory array, including determining whether to sort the list based on an accumulated number of instructions requesting deallocation of a block of memory; and
   sorting the list, based on the sort determination, according to the memory size of the blocks of free memory indicated by the list.

2. The method of claim 1, wherein the accumulated number of instructions constitute instructions received since the list was last sorted.

3. The method of claim 1, wherein the determining step further includes the substeps of:
   comparing the accumulated number of deallocation instructions to a threshold value; and
   outputting a sort signal when the accumulated number of deallocation instructions is greater than the threshold value; and
   wherein the sorting step further includes the substep of initiating the sorting of the list in response to the sort signal.

4. The method of claim 3, wherein the threshold value is set to 100.

5. The method of claim 1, wherein the determining step further includes the substep of:
   determining whether to sort the list based on the elapsed time since the list was last sorted.

6. The method of claim 5, wherein the determining step further includes the substeps of:
   comparing the elapsed time to a first threshold value; and
   comparing to a second threshold value an accumulated number of instructions, received over a particular time, requesting deallocation of a block of memory, wherein the accumulated number of deallocation instructions is compared to the second threshold value when the elapsed time is greater than the first threshold value.

7. The method of claim 6, wherein the determining step further includes the substep of:
   outputting a sort signal when the accumulated number of deallocation instructions is greater than the second threshold value; and
   wherein the sorting step further includes the substep of initiating the sorting of the list in response to the sort signal.

8. The method of claim 6, wherein the first threshold value is 0.5 seconds.

9. The method of claim 6, wherein the second threshold value is 50.

10. The method of claim 1, wherein the sorting step further includes the substep of:
    preventing access of the memory array while sorting the list.

11. The method of claim 1, wherein the allocating step further includes the substep of:
    traversing the sorted list to determine the block of free memory in the memory array to store the data.

12. The method of claim 11, wherein the traversing step further includes the substep of:
    traversing the list to locate the block of free memory having a memory size that most closely matches the size of the data.

13. The method of claim 1, further including the step of:
    allocating blocks of the memory array for the storage of data using the sorted list.

14. A computer for managing a memory array, the computer comprising:
    a memory having program instructions; and
    a processor, responsive to the programming instructions, configured to:
      provide a list of pointers to blocks of free memory of the memory array, each block having a memory size;
      determine whether to sort the list based on deallocation activity of the memory array, including determining whether to sort the list based on an accumulated number of instructions requesting deallocation of a block of memory; and
      sort the list according to the memory size of the blocks of free memory indicated by the list.

15. The computer of claim 14, wherein the accumulated number of instructions constitute instructions received since the list was last sorted.

16. The computer of claim 14, wherein the processor is further configured to:
    compare the accumulated number of deallocation instructions to a threshold
    output a sort signal when the accumulated number of deallocation instructions is greater than the threshold value; and
    initiate the sorting of the list in response to the sort signal.

17. The computer of claim 14, wherein the threshold value is set to 100.

18. The computer of claim 14, wherein the processor is further configured to determine whether to sort the list based on the elapsed time since the list was last sorted.

19. The computer of claim 18, wherein the processor is further configured to:
  compare the elapsed time to a first threshold value; and
  compare to a second threshold value an accumulated number of instructions, received over a particular time, requesting deallocation of a block of memory, wherein the accumulated number of deallocation instructions is compared to the second threshold value when the elapsed time is greater than the first threshold value.

20. The computer of claim 19, wherein the processor is further configured to:
  output a sort signal when the accumulated number of deallocation instructions is greater than the second threshold value; and
  initiate the sorting of the list in response to the sort signal.

21. The computer of claim 19, wherein the first threshold value is 0.5 seconds.

22. The computer of claim 19, wherein the second threshold value is 50.

23. The computer of claim 14, wherein the processor is further configured to prevent access to the memory array while sorting the list.

24. The computer of claim 14, wherein the processor is further configured to traverse the sorted list to determine the block of free memory in the memory array to store the data.

25. The computer of claim 24, wherein the processor is further configured to traverse the list to locate the block of free memory having a memory size that most closely matches the size of the data.

26. The computer of claim 14, wherein the processor is configured to allocate blocks of the memory array for the storage of data using the sorted list.

27. A computer-readable medium containing instructions for controlling a data processing system to perform a method for managing memory, the method comprising the steps of:
  providing a list of pointers to blocks of free memory of the memory array, each block having a memory size;
  determining whether to sort the list based on deallocation activity of the memory array, including determining whether to sort the list based on an accumulated number of instructions requesting deallocation of a block of memory; and
  sorting the list, based on the sort determination, according to the memory size of the blocks of free memory indicated by the list.

28. The method of claim 27, wherein the accumulated number of instructions constitute instructions received since the list was last sorted.

29. The method of claim 27, wherein the determining step further includes the substeps of:
  comparing the accumulated number of deallocation instructions to a threshold
  outputting a sort signal when the accumulated number of deallocation instructions is greater than the threshold value; and
  wherein the sorting step further includes the substep of initiating the sorting of the list in response to the sort signal.

30. The method of claim 27, wherein the threshold value is set to 100.

31. The method of claim 27, wherein the determining step further includes the substep of:
  determining whether to sort the list based on the elapsed time since the list was last sorted.

32. The method of claim 31, wherein the determining step further includes the substeps of:
  comparing the elapsed time to a first threshold value; and
  comparing to a second threshold value an accumulated number of instructions, received over a particular time, requesting deallocation of a block of memory, wherein the accumulated number of deallocation instructions is compared to the second threshold value when the elapsed time is greater than the first threshold value.

33. The method of claim 32, wherein the determining step further includes the substep of:
  outputting a sort signal when the accumulated number of deallocation instructions is greater than the second threshold value; and
  wherein the sorting step further includes the substep of initiating the sorting of the list in response to the sort signal.

34. The method of claim 32, wherein the first threshold value is 0.5 seconds.

35. The method of claim 32, wherein the second threshold value is 50.

36. The method of claim 27, wherein the sorting step further includes the substep of:
  preventing access of the memory array while sorting the list.

37. The method of claim 27, wherein the allocating step further includes the substep of:
  traversing the sorted list to determine the block of free memory in the memory array to store the data.

38. The method of claim 37, wherein the traversing step further includes the substep of:
  traversing the list to locate the block of free memory having a memory size that most closely matches the size of the data.

39. The method of claim 27, further including the step of:
  allocating blocks of the memory array for the storage of data using the sorted list.

40. An apparatus for managing a memory array, the apparatus comprising:
  means for providing a list of pointers to blocks of free memory of the memory array, each block having a memory size;
  means for determining whether to sort the list based on deallocation activity of the memory array, including means for determining whether to sort the list based on an accumulated number of instructions requesting deallocation of a block of memory; and
  means for sorting the list according to the memory size of the blocks of free memory indicated by the list.

41. A computer data signal embodied in a carrier wave and representing sequences of instructions which, when executed by a processor, cause the processor to securely address a peripheral device at an absolute address by performing the steps of:
  providing a list of pointers to blocks of free memory of the memory array, each block having a memory size;
  determining whether to sort the list based on deallocation activity of the memory array, including determining whether to sort the list based on an accumulated number of instructions requesting deallocation of a block of memory; and
  sorting the list, based on the sort determination, according to the memory size of the blocks of free memory indicated by the list.

42. A computer-implemented method for managing a memory array, comprising:
  providing a list of pointers to blocks of free memory of the memory array, each block having a memory size;

determining whether to sort the list based on an accumulated number of instructions requesting deallocation of a block of memory, wherein determining whether to sort the list further includes:
  comparing the accumulated number of deallocation instructions to a threshold value, and
  outputting a sort signal when the accumulated number of deallocation instructions is greater than the threshold value; and
sorting the list, based on the sort signal, according to the memory size of the blocks of free memory indicated by the list, and wherein the accumulated number of instructions is determined from instructions received since the list was last sorted.

43. A computer for managing a memory array, the computer comprising:
  a memory having program instructions; and
  a processor, responsive to the programming instructions, configured to:
    provide a list of pointers to blocks of free memory of the memory array, each block having a memory size;
    determine whether to sort the list based on an accumulated number of instructions requesting deallocation of a block of memory, wherein the processor is further configured to:
      compare the accumulated number of deallocation instructions to a threshold value, and
      output a sort signal when the accumulated number of deallocation instructions is greater than the threshold value; and
    sort the list, based on the sort signal, according to the memory size of the blocks of free memory indicated by the list, and wherein the accumulated number of instructions is determined from instructions received since the list was last sorted.

44. A computer-readable medium containing instructions for controlling a data processing system to perform a method for managing memory, the method comprising:
  providing a list of pointers to blocks of free memory of the memory array, each block having a memory size;
  determining whether to sort the list based on an accumulated number of instructions requesting deallocation of a block of memory, wherein determining whether to sort the list further includes:
    comparing the accumulated number of deallocation instructions to a threshold value, and
    outputting a sort signal when the accumulated number of deallocation instructions is greater than the threshold value; and
  sorting the list, based on the sort signal, according to the memory size of the blocks of free memory indicated by the list, and wherein the accumulated number of instructions is determined from instructions received since the list was last sorted.

45. An apparatus for managing a memory array, the apparatus comprising:
  means for providing a list of pointers to blocks of free memory of the memory array, each block having a memory size;
  means for determining whether to sort the list based on an accumulated number of instructions requesting deallocation of a block of memory wherein the determining means further includes:
    means for comparing the accumulated number of deallocation instructions to a threshold value, and
    means for outputting a sort signal when the accumulated number of deallocation instructions is greater than the threshold value; and
  means for sorting the list, based on the sort signal, according to the memory size of the blocks of free memory indicated by the list, and wherein the accumulated number of instructions is determined from instructions received since the list was last sorted.

* * * * *

UNITED STATES PATENT AND TRADEMARK OFFICE
CERTIFICATE OF CORRECTION

PATENT NO. : 6,430,665 B1
DATED : August 6, 2002
INVENTOR(S) : David Alison et al.

It is certified that error appears in the above-identified patent and that said Letters Patent is hereby corrected as shown below:

Column 6,
Line 58, after "threshold" insert -- value; --; and

Column 7,
Line 53, after "threshold" insert -- value; and --.

Signed and Sealed this

Twelfth Day of November, 2002

Attest:

Attesting Officer

JAMES E. ROGAN
Director of the United States Patent and Trademark Office